US007444621B2

(12) United States Patent
Pletcher et al.

(10) Patent No.: US 7,444,621 B2
(45) Date of Patent: Oct. 28, 2008

(54) METHOD AND SYSTEM FOR PROVIDING A COMMON OPERATING SYSTEM

(75) Inventors: Richard A. Pletcher, Redmond, WA (US); David J. D'Souza, Mercer Island, WA (US); Peter M. Wilson, Kirkland, WA (US); Myung Ryul Jang, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 961 days.

(21) Appl. No.: 10/783,781

(22) Filed: Feb. 20, 2004

(65) Prior Publication Data

US 2005/0187894 A1 Aug. 25, 2005

(51) Int. Cl.
*G06F 9/44* (2006.01)
(52) U.S. Cl. .................... 717/120; 717/104; 717/105
(58) Field of Classification Search ......... 717/104–105, 717/120–123
See application file for complete search history.

(56) References Cited

U.S. PATENT DOCUMENTS

| | | | | |
|---|---|---|---|---|
| 5,867,710 A * | 2/1999 | Dorris et al. | ............... | 717/124 |
| 6,075,939 A * | 6/2000 | Bunnell et al. | ............. | 717/107 |
| 6,671,745 B1 * | 12/2003 | Mathur et al. | ............... | 719/328 |
| 6,832,381 B1 * | 12/2004 | Mathur et al. | ............... | 719/328 |
| 7,039,739 B2 * | 5/2006 | Bonola | ....................... | 710/262 |
| 7,140,015 B1 * | 11/2006 | Bhanjois et al. | ............ | 718/100 |
| 2004/0088683 A1 * | 5/2004 | Gazdik et al. | ............... | 717/133 |

OTHER PUBLICATIONS

T. Leschke, "Achieving Speed and Flexibility by Separating Management from Protection: Embracing the Exokernel Operating System", Operating Systems Review, vol. 38(4), pp. 5-19, Oct. 2004.*
D. Engler, M. Kaashoek, J. O'Toole Jr.; "Exokernel: an operating system architecture for application-leel resource management", Proceedings of the Fifteenth Symposium on Operating Systems Principles, ACM, Dec. 1995, pp. 1-16.*

* cited by examiner

*Primary Examiner*—William H Wood
(74) *Attorney, Agent, or Firm*—Merchant & Gould; Ryan T. Grace

(57) ABSTRACT

A method and system for providing a common operating system feature set for supporting a variety of operating system configurations is described. The common operating system feature set is organized to provide a minimal memory footprint applicable to a number of devices and methods of deployment. The common operating system includes dependencies among operating system components that provide a selection of integrated components that are validated for reliability. The common operating system includes an application program interface set that provides functionality for a variety of operating system scenarios.

20 Claims, 3 Drawing Sheets

METHOD AND SYSTEM FOR PROVIDING A COMMON OPERATING SYSTEM

BACKGROUND OF THE INVENTION

Computer operating systems are monolithic and include many complex dependencies between components and modules. Operating system components depend on each other based on a hierarchical relationship. Components at upper layers in the hierarchy are dependent on a larger number of components than components at lower layers. Components belonging to lower layers in the hierarchy are not dependent on components in the higher layers. As a result, components at lower layers in the operating system have access to a lower number of available operating system services.

As the size of an operating system increases, testing becomes more costly. The effect of removing or modifying a component is difficult to understand when an operating system includes a large number of complex dependent components. The effectiveness of testing improves when the number of dependencies among components is decreased.

The large number of complex dependencies is the result of a lack of dependency management during operating system development cycles. What is needed is a way to establish a common operating system with a limited number of dependent components.

SUMMARY OF THE INVENTION

A method and system for providing a common operating system feature set for supporting a variety of operating system configurations is described. The common operating system feature set is organized to provide a minimal memory footprint applicable to a number of devices and methods of deployment. The common operating system includes dependencies among operating system components that provide a selection of integrated components that are validated for reliability. The common operating system includes an application program interface (API) set that provides functionality for a variety of operating system scenarios.

The method includes defining operating system components; identifying dependencies of the operating system components; creating component groups such that the components in a group share common dependencies; establishing dependency rules among the component groups; and enforcing the dependency rules.

An exemplary system for providing a common operating system includes a hardware abstraction layer, a kernel, an operating system dynamic link library layer, a subsystem dynamic link library layer, and a networking layer. The hardware abstraction layer provides interaction with hardware devices. The kernel is dependent on the hardware abstraction layer, and provides essential services to operating system components. The operating system dynamic link library, the subsystem dynamic link library, and the networking layer all depend on the kernel. The operating system dynamic link library layer includes a library of functions for executing operating system applications. The subsystem dynamic link library layer supports application program interfaces such that the application program interfaces are limited to basic operating system components. The networking layer supports network communication functionality of the operating system applications.

DETAILED DESCRIPTION OF THE PREFERRED EMBODIMENT

Briefly stated, the present invention is directed to a method and system for providing a common operating system feature set for supporting a variety of operating system configurations. The common operating system feature set is organized to provide a minimal memory footprint applicable to a number of devices and methods of deployment. The common operating system includes dependencies among operating system components that provide a selection of integrated components that are validated for reliability. The common operating system includes an application program interface (API) set that provides functionality for a variety of operating system scenarios.

Illustrative Operating Environment

Figure 1:
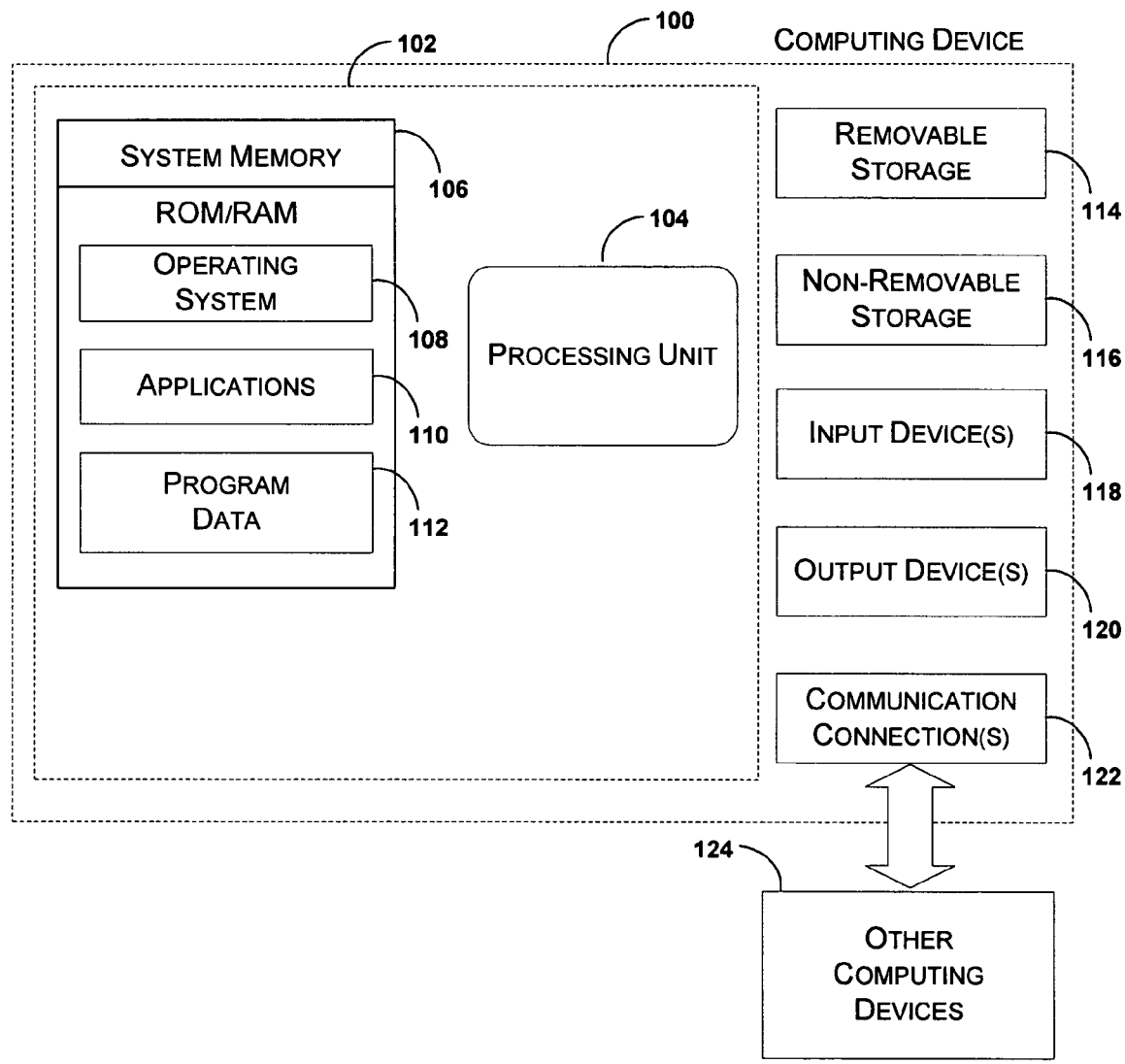
FIG. 1 shows an exemplary computing environment in which this invention may be implemented.

With reference to FIG. 1, one exemplary system for implementing the invention includes a computing device, such as computing device 100. A basic configuration includes those components within dashed line 102. In the basic configuration, computing device 100 typically includes at least one processing unit 104 and system memory 106. Depending on the exact configuration and type of computing device, system memory 106 may be volatile (such as RAM), non-volatile (such as ROM, flash memory, etc.) or some combination of the two. System memory 106 typically includes an operating system 108, one or more applications 110, and may include program data 112.

Computing device 100 may have additional features or functionality. For example, computing device 100 may also include additional data storage devices (removable and/or non-removable) such as, for example, magnetic disks, optical disks, or a removable flash memory module. Such additional storage is illustrated in FIG. 1 by removable storage 114 and non-removable storage 116. Computer storage media may include volatile and non-volatile, removable and non-removable media implemented in any method or technology for storage of information, such as computer readable instructions, data structures, program modules, or other data. System memory 106, removable storage 114 and non-removable storage 116 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 118 such as keyboard, mouse, pen, voice input device, touch input device, etc. Output device(s) 120 such as a display, speakers, printer, etc. may also be included. These devices are well know in the art and need not be discussed at length here.

Computing device 100 may also contain communication connections 122 that allow the device to communicate with other computing devices 124, such as over a network. Communication connection 122 is one example of communication media. Communication media may typically be embodied by computer readable instructions, data structures, program modules, or other data in a modulated data signal, such as a carrier wave or other transport mechanism, and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Common Operating System

A common operating system provides a reliable base layer to be used in every operating system configuration. The common operating system represents a minimum base application program interface (API) set. Any software written to the API set is also compatible with all configurations of the operating system. For example, test code written against the API set is executable under all operating system conditions. Testing procedures can be applied to check performance, stress, and complete API coverage for the operating system and other targeted platforms. Code used to test operating system components depends on a test platform based on the common operating system. Thus, test code can be developed easily and the reliability of the operating system can be ensured.

The common operating system increases the general reliability of embedded runtimes through focused testing of a stable platform shared across all embedded configurations. The test procedure can be broken down into components such that a core set of operating system components may be tested. Testing may be expanded by adding more components. For example, each operating system component may be tested individually to determine if each component is operable with the core.

The common operating system provides a component-based engineering tool. For example, the common operating system may be used to build the smallest possible configuration (i.e., minimal footprint) on which to validate component manifests. The common operating system provides an aggressive footprint reduction resulting in a reduced bill of materials cost for embedded original equipment manufacturers (OEM). The reliability and minimal surface area of the common operating system are well-suited for creating fixed-function servers. The principle benefit of creating fixed-function servers is to reduce customer's total cost of ownership. Components of the common operating system may be serviced (i.e., placed with bug fixes, replaced by newer versions, etc.) by components that have upper layer dependencies in the operating system structure.

The common operating system improves documentation around the core operating system (including memory, boot performance, and API set) based on various analyses performed to validate the common operating system. Improved documentation increases OEM's and independent software vendor's understanding of operating system behavior.

The common operating system operates as a pre-boot operating system. The common operating system is installed by laying a pre-built, customized image of the operating system onto target hardware. Once the common operating system is installed to a computing device, common operating system applications may then install the remainder of the operating system that layers upon the common operating system, or install a different version of operating system.

The common operating system assists in system recovery by being capable of booting from a read-only media such as a digital compact disc (CD). An entire operating system can be installed on to a CD. If the system installed on a hard disk crashes, the operating system can be recovered by rebooting the machine with the operating system from the CD. However, the system may be recovered more quickly by rebooting a minimal subset of the operating system installed on a CD. The common operating system provides a platform to recover the operating system installed on a hard disk. In one embodiment, the common operating system can be booted from a removable flash memory module plugged into a universal serial bus port.

Figure 2:
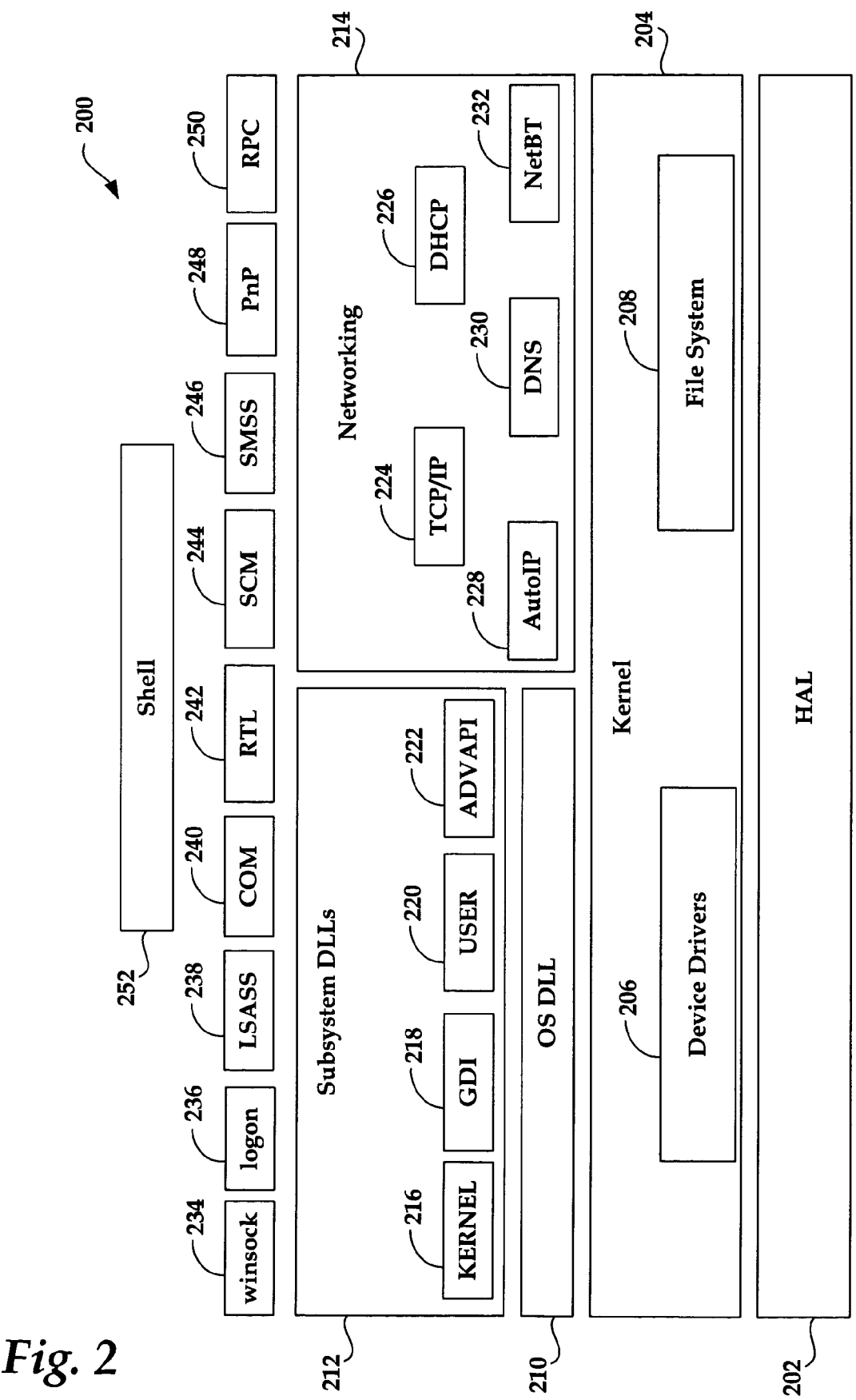
FIG. 2 illustrates an exemplary functional block diagram of a common operating system in accordance with the present invention.

FIG. 2 illustrates a functional block diagram of a common operating system in accordance with the present invention. Common operating system 200 is a building block that includes the core operating system features required for all operating system configurations. However, common operating system 200 does not include any hardware architecture specific features of the operating system. Common operating system 200 represents the base layer on which future versions of the operating system may be built. Common operating system 200 also provides a standard building block for developing other operating system products.

Core functionality for common operating system 200 is provided by hardware abstraction layer (HAL) 202 and kernel 204. HAL 202 is a layer of programming that allows common operating system 200 to interact with a hardware device at a general or abstract level. HAL 202 can be called from kernel 204 or from a device driver.

Kernel 204 is the central module of common operating system 200. When common operating system 200 is booted, kernel 204 is the first component to load. After loading, kernel 204 remains in the main memory. Kernel 204 provides the essential services required by other components in common operating system 200. Kernel 204 is dependent on HAL 202. Kernel includes and is dependent on device drivers 206 and file system 208. File system 208 provides an abstraction that allows other operating system components and applications to interact with storage files as a collection of files. Portions of kernel 204 and other device drivers are loaded from file system 208.

Device drivers 206 include programs that control devices such as a printer, a disk drive or a keyboard. In one embodiment, device drivers 206 are necessary to create a bootable system that contains common operating system 200. Certain classes of device drivers may be used to create a bootable image of common operating system 200. Such classes include device drivers for system devices, storage devices, user interface devices, and networking devices. However, the classes of device drivers are not part of the common operating system building block. The device driver classes are added later via a build process to create an installable common operating system.

The programming layers above kernel 204 include operating system dynamic link library (DLL) 210, subsystem DLLs 212, and networking layer 214. Operating system DLL 210 includes a library of executable functions that can be used by an application supported by an operating system. For example, a Windows® NT DLL is a library of executable functions used by Windows® NT applications. A DLL may be used by several applications at the same time. Some DLLs are provided with the operating system and are available for any application. Other DLLs are written for a particular application and are loaded with the application.

Subsystem DLLs 212 provide support for APIs that provide functionality for applications. In one embodiment, the API may be WIN32. Common operating system 200 limits the APIs to the basic components. The basic API sets supported by common operating system 200 include DLLs for memory management (KERNEL) 216, graphical device interface (GDI) 218, user interface elements (USER) 220, and security and encryption applications (ADVAPI) 222.

KERNEL 216 supports many different memory management functions including: atom functions, communication port support, console support, debugging support, device I/O, DLL functions, error handling, file I/O, file mapping, file system functions, handle and object functions, mail slot, memory management, national language support, named pipe, process and thread, resource loading, string, structured exception handling, synchronization, system information, time functions, tool help functions, unicode and character set.

The functions supported by GDI 218 include the following operating system features: bitmap, brush, clipping, color, device context, filled shape, font and text, line and curve, metafile, path, pen, printing, and region.

USER 220 supports the following operating system features: button functions and messages, caret management, clipboard support, combo box functions, coordinate space and transformation functions, cursor management, dialog box messages, dynamic data exchange, dynamic data exchange management, edit control, hooks, icon loading, keyboard accelerator, keyboard input, list box control, menu control, windows message and message queue, mouse input, multiple display monitor support, multiple document interface, painting and drawing, raw input, rectangle functions, resource loading (such as icons), scroll bar, string functions, system information functions, logout, timer functions, window management, window class registrations, and window property functions.

The following functions are supported by ADVAPI 222: access check, security descriptor related functions, process management functions, registry functions, service management functions, system shutdown functions, and event tracing functions.

Networking layer 214 provides network functionality such that the applications in subsystem DLLs 212 can communicate with a network. Networking layer 214 includes transmission control protocol/internet protocol (TCP/IP) stack 224, dynamic host configuration protocol (DHCP) client 226, automatic private IP addressing (AutoIP) 228, domain name system (DNS) client 230, and network basic input output operating system over TCP/IP (NetBT) 232. Common operating system 200 uses networking layer 214 to test the network properties of core components.

TCP/IP stack 224 supports normal TCP/IP operations which include communications protocols for connecting hosts on the internet. TCP/IP is a standard for transmitting data over networks. TCP/IP stack 224 implements the current version of IP (IPv4) and future IP generations such as Ipv6. IP Security (IPSec) is integrated into TCP/IP stack 224. IPSec is a set of protocols that support the secure exchange of packets at the IP layer.

TCP/IP stack 224 implements several protocols including user datagram protocol (UDP), internet control message protocol (ICMP), and address resolution protocol (ARP). UDP provides a direct way to send and receive datagrams over an IP network. ICMP supports packets containing error, control, and informational messages. ARP converts an IP address into a physical address. TCP/IP stack 224 also supports IP multicasting.

DHCP client 226 provides the protocol for assigning dynamic IP addresses to devices on the network from a DHCP server. DHCP client 226 contains a multicast address dynamic client application protocol for obtaining a multicast group address assignment. AutoEP 228 provides functionality such that DHCP client 226 can automatically self-configure an IP address when the DHCP server is not available. DNS client 230 translates domain names into IP addresses.

NetBT 232 is an API that adds special functions for local-area networks (LANs). If a DNS server is not available on the network, other computers are located through broadcast name resolution via NetBT 232. NetBT 232 also enables support for legacy applications that require a NetBT interface and name resolution.

Layers of common operating system 200 above DLLs 210, 212 and networking layer 214 include winsock 234, logon client 236, local security authentication server (LSASS) 238, component object model (COM) 240, runtime library (RTL) 242, service control manager (SCM) module 244, session management server (SMSS) 246, plug and play (PnP) manager 248, and remote procedure call (RPC) 250. Shell 252 is the outermost layer of common operating system 200. Shell 252 is optional because an application can be substituted in its place.

Winsock 234 is an API for developing programs that can communicate with other computing devices via the TCP/IP protocol. Winsock functionality is included in common operating system 200 because nearly every computing device has a network interface.

Logon client 236 provides functionality such that a local user or a network user can log-on to common operating system 200. Logon client 236 includes the minimal functionality required to establish a user's identity after authenticating the user against a local security account manager (SAM). Logon client 236 is an optional component of common operating system 200 because not all devices require a user to log-on.

LSASS 238 provides basic functionality for security applications such as cryptography and digital certification. LSASS 238 authenticates against SAM and supports local log-on capabilities. LSASS 238 receives authentication requests from logon client 236 and calls the appropriate authentication package to perform account verification and validation. A user interface (UI) associated with logon client 236 interacts with the logon client/LSASS process to log-in the user. Common operating system 200 can boot with a minimum number of security packages required for local log-on.

COM 240 is a software architecture for building component-based applications. COM objects are discrete components, each with a unique identity, which expose interfaces that allow applications and other components to access their features. RTL 242 includes a library of routines that are bound to a program during execution. SCM module 244 controls the starting and stopping of services. SCM module 244 is necessary because DHCP 226 and DNS 230 operate as services.

SMSS 246 is a session manager for managing multiple subsystem sessions and user sessions. PnP manager 248 supports plug and play installation of drivers needed to control detected hardware. PnP manager 248 is a hardware-related feature but is not architecture-specific. PnP manager 248 is an optional component since some devices are not PnP compatible.

RPC 250 is a protocol that allows a program on one computer to execute code on a server computer or in a different process on the same computer. Using RPC 250, a system developer need not develop specific procedures for the server. The client program sends a message to the server with appropriate arguments and the server returns a message containing the results of the executed code.

Common operating system 200 may be used as a development tool for componentization testing and component-based unit testing. Componentization involves understanding and reducing dependencies among components to make the operating system less monolithic. Component grouping improves operating system serviceability by providing a framework that assists in transforming the operating system from a monolithic system to a componentized system. Common operating system 200 provides a highly reliable base operating system layer of the componentized system.

Common operating system 200 creates component groups by defining the base operating system layer on which the component groups rest upon. The grouping of components eliminates the monolithic structure of a traditional operating system. Depending on which layer a component resides in an operating system, an appropriate subset of headers can be provided such that the component does not depend on components in upper layers.

Figure 3:
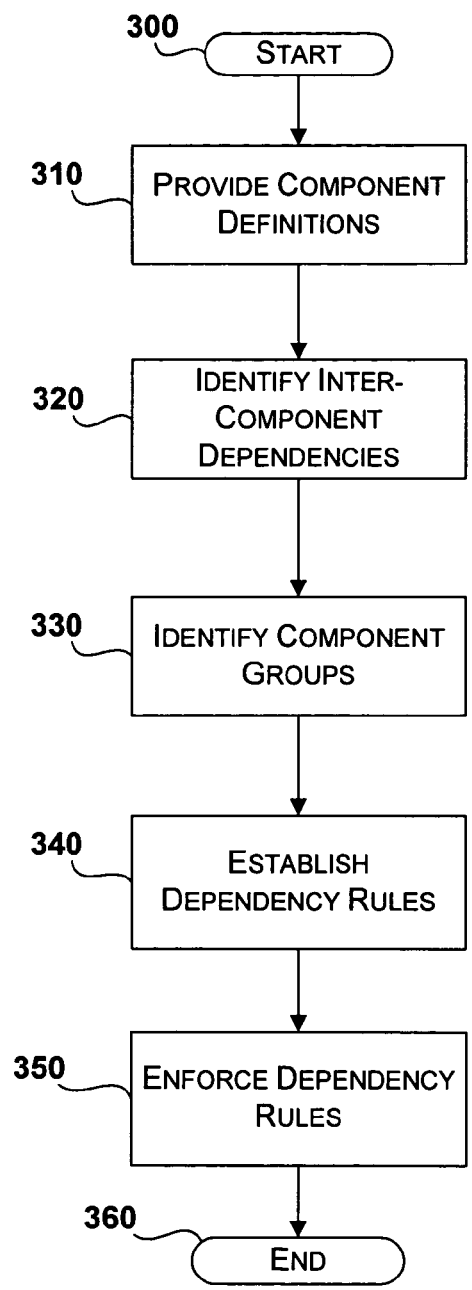
FIG. 3 is an operational flow diagram illustrating a process for transforming a monolithic operating system into a common operating system in accordance with the present invention.

The process for creating a common operating system is described with reference to FIG. 3. The common operating system is created by managing dependencies among operating system components. The process begins at block 300 where a standard operating system has many inter-dependent components. At block 310, component definitions are provided by determining the function of each component. Processing moves to block 320.

At block 320, inter-component dependencies are identified by determining the position of each component within the monolithic structure of the operating system. Processing advances to block 330.

At block 330, component groups that represent meaningful building blocks for enabling target scenarios are identified. Components in each group share common dependencies. The creation of component groups eliminates the dependencies among components. For example, a component in each of the USER, GDI and KERNEL DLLs may all depend on another component in the shell. In this example, the three dependencies are eliminated by creating a component group (e.g., a new DLL) in the shell. The new DLL includes the minimum number of APIs required to execute the three components. Thus, each component is executed using a subset of the APIs in the new DLL. In another embodiment, inter-component dependencies are eliminated by modifying the source code such that upper level dependencies no longer exist. Processing continues at block 340

At block 340, dependency rules among the component groups are established. The dependency rules determine which dependencies are appropriate for each component and component group. The dependency rules minimize the number of dependencies that exist between operating system components. Processing flows to block 350.

At block 350, dependency rules among the component groups are enforced. Dependency rule enforcement prevents components from having undesirable dependencies. Dependency rule enforcement ensures the efficient use of DLLs. Processing terminates at block 360.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for providing a common operating system, the method comprising:
    identifying components of a monolithic operating system, wherein the operating system has a monolithic structure and components are arranged in a hierarchical relationship;
    identifying dependencies between the components of the monolithic operating system, wherein the dependencies are determined based on the position of the dependencies within the monolithic operating system;
    generating component groups from the identified dependencies, wherein the component groups share common dependencies;
    generating dependency rules, wherein the dependency rules are configured to provide fewer dependencies than the dependencies in the monolithic operating system; and
    enforcing the dependency rules to establish the common operating system, wherein the common operating system is configured to support the components of the generated component groups.

2. The computer-implemented method of claim 1, wherein generating component groups from the identified dependencies includes generating subset headers for components of the component group, wherein the subset headers eliminate dependencies on components in upper layers of the hierarchical relationship of the monolithic operating system.

3. The computer-implemented method of claim 1, wherein the common operating system utilizes less memory than the monolithic operating system.

4. The computer-implemented method of claim 1, further comprising testing one of the components of the groups of components to validate reliability of the component.

5. The computer-implemented method of claim 1, further comprising testing component manifests base on the common operating system.

6. The computer-implemented method of claim 1, wherein the common operating system is configured as a pre-boot operating system.

7. The computer-implemented method of claim 1, further comprising accessing the common operating system for componentized testing.

8. The computer-implemented method of claim 1, wherein the component groups are generated based on the function of the components of the monolithic operating system.

9. A computer readable storage medium having computer executable instructions for providing a common operating system, the instructions comprising:
    identifying components of a monolithic operating system, wherein the operating system has a monolithic structure and components are arranged in a hierarchical relationship;
    identifying dependencies between the components of the monolithic operating system, wherein the dependencies are determined based on the position of the dependencies within the monolithic operating system;
    generating component groups from the identified dependencies, wherein the component groups share common dependencies, wherein the components of the component groups include subset headers, wherein the subset headers eliminate dependencies on components in upper layers of the hierarchical relationship of the monolithic operating system;
    generating dependency rules, wherein the dependency rules are configured to provide fewer dependencies than the dependencies in the monolithic operating system; and
    enforcing the dependency rules to establish the common operating system, wherein the common operating system is configured to support the components of the generated component groups.

10. The computer-readable storage medium of claim 9, wherein the common operating system utilizes less memory than the monolithic operating system.

11. The computer-implemented method of claim 9, further comprising testing one of the components of the groups of components to validate reliability of the component.

12. The computer-implemented method of claim 9, further comprising testing component manifests base on the common operating system.

13. The computer-implemented method of claim 9, wherein the common operating system is configured as a pre-boot operating system.

14. The computer-implemented method of claim 9, further comprising accessing the common operating system for componentized testing.

15. The computer-implemented method of claim 9, wherein the component groups are generated based on the function of the components of the monolithic operating system.

16. A system for providing a common operating system, the system comprising:
 a processor; and
 a memory having computer executable instructions stored thereon for:
  identifying components of a monolithic operating system, wherein the operating system has a monolithic structure and components are arranged in a hierarchical relationship;
  identifying dependencies between the components of the monolithic operating system, wherein the dependencies are determined based on the position of the dependencies within the monolithic operating system;
  generating component groups from the identified function of each component, wherein the component groups share common dependencies, wherein the components of the component groups include subset headers, wherein the subset headers eliminate dependencies on components in upper layers of the hierarchical relationship of the monolithic operating system;
  generating dependency rules, wherein the dependency rules are configured to provide fewer dependencies than the dependencies in the monolithic operating system; and
  enforcing the dependency rules to establish the common operating system, wherein the common operating system is configured to support the components of the generated component groups.

17. The system of claim 16, wherein the common operating system utilizes less memory than the monolithic operating system.

18. The system of claim 16, further comprising testing one of the components of the groups of components to validate reliability of the component.

19. The system of claim 16, further comprising testing component manifests base on the common operating system.

20. The system of claim 16, further comprising accessing the common operating system for componentized testing.

* * * * *